Aug. 22, 1967 V. R. WHITE 3,336,992
DRILL BITS
Filed Oct. 8, 1965 2 Sheets-Sheet 1
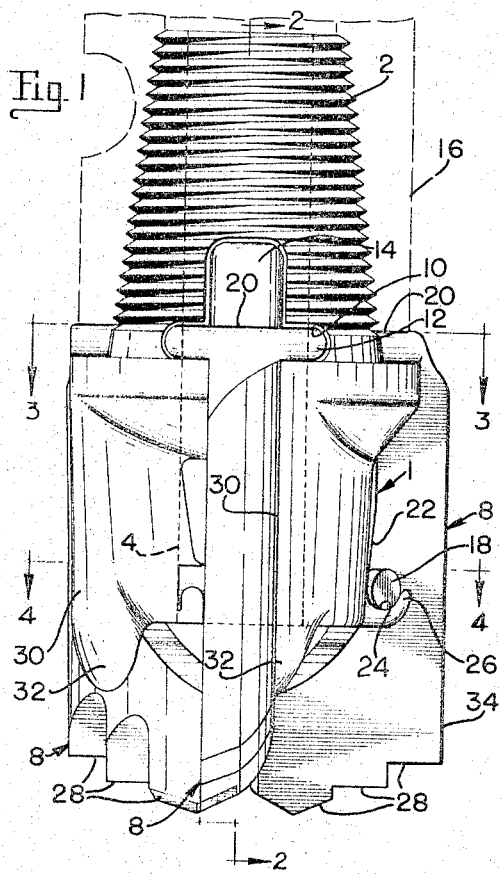
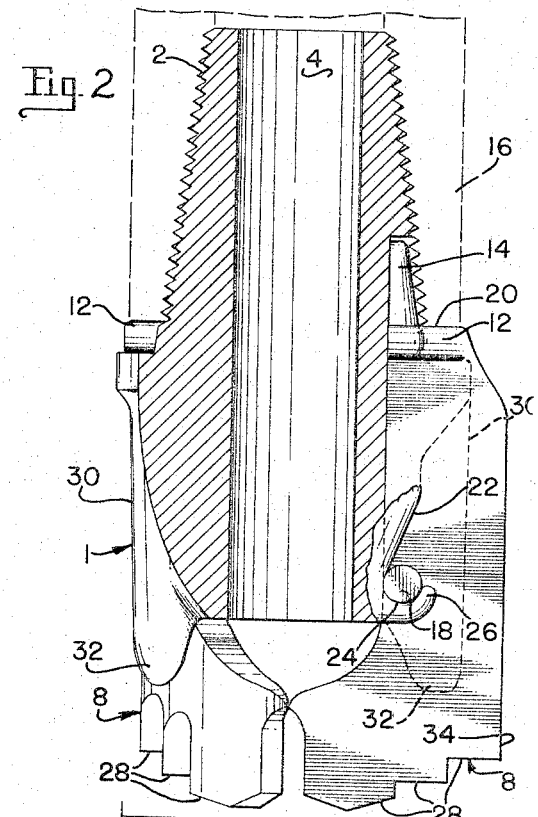
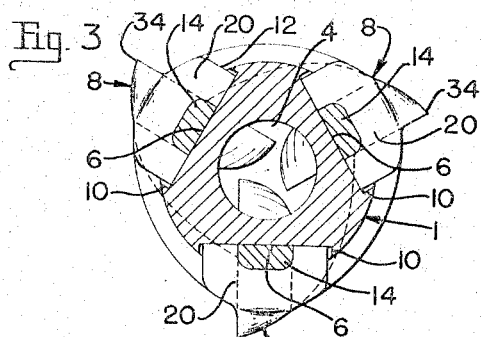
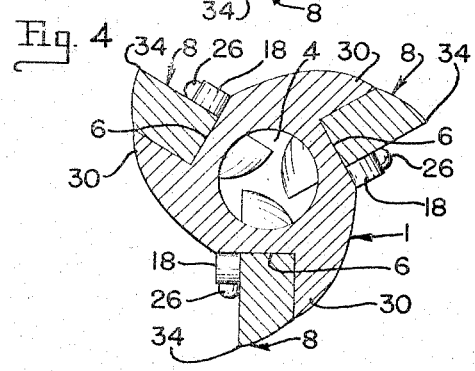
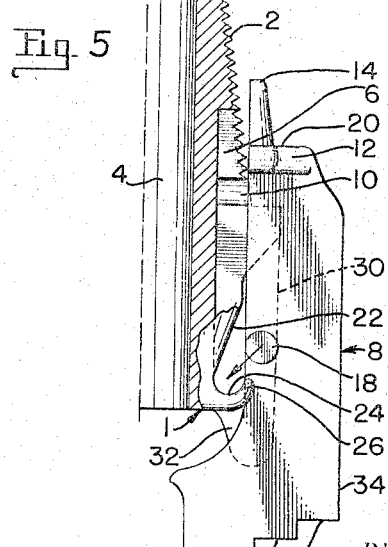
INVENTOR.
VAN R. WHITE
BY
*Wayland D. Keith*
HIS AGENT

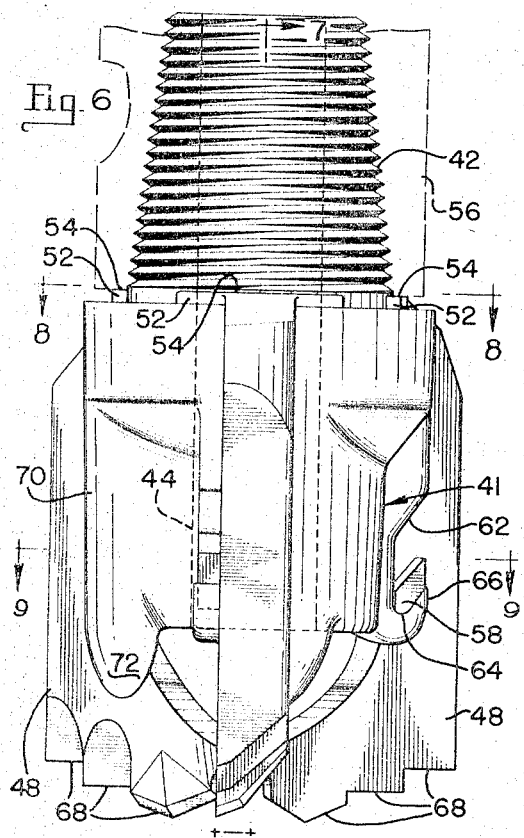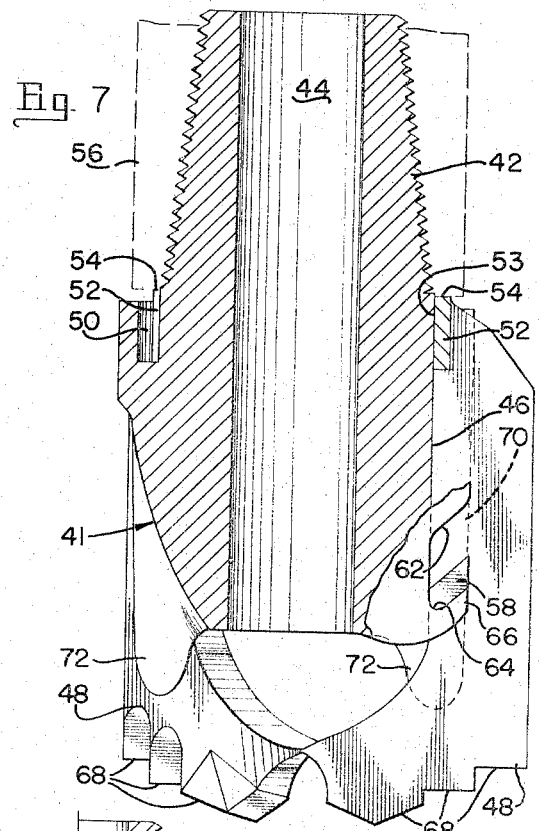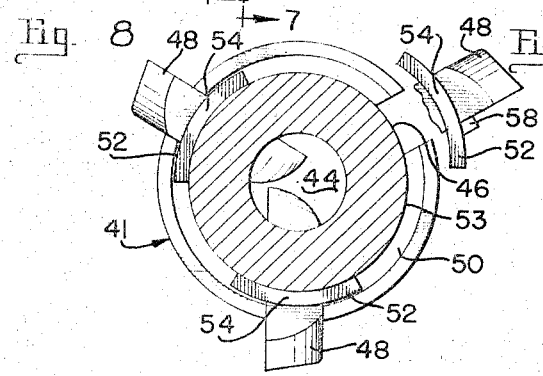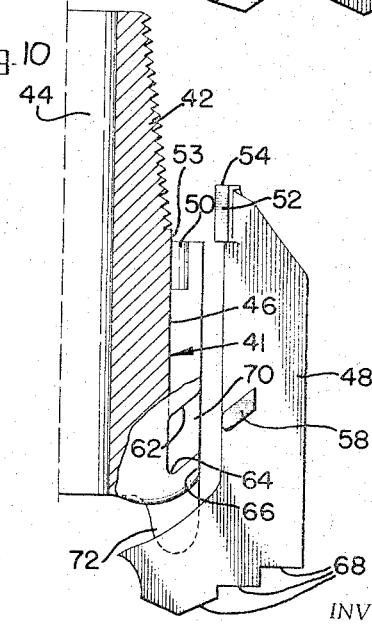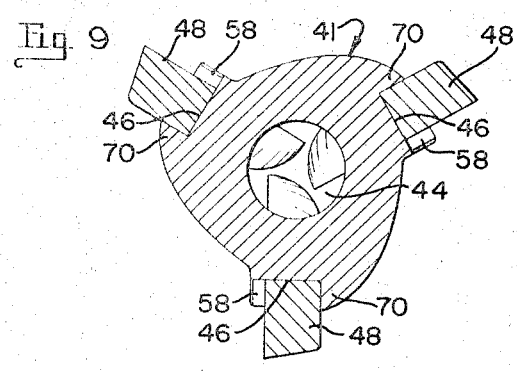

United States Patent Office 3,336,992
Patented Aug. 22, 1967

3,336,992
DRILL BITS
Van R. White, P.O. Box 448, Quanah, Tex. 79252
Filed Oct. 8, 1965, Ser. No. 494,197
9 Claims. (Cl. 175—412)

This invention relates to improvements in drill bits and more particularly to a drag type drill bit with removable blades.

The present drill bits are so constructed that the bodies may be made to receive blades thereon, so when the pin of the bit body is screwed on to a conventional drill stem or drill stem sub the blades will be securely locked in place.

In the drilling of bore holes with a rotary drilling rig, such as in the search for oil or water for seismographic exploration, it is very desirable to have a bit whereby the blades may be quickly removed and replaced with new bit blades, or with sharpened bit blades, without undue loss of time, and to enable the present drag type drill bits to be used interchangeably with rock bits, such as employ milling cones thereon.

The present bit blade is so constructed that, upon removal of the bit from the lower end of the drill stem, the blades, thereof, may be removed and quickly replaced thereby to expedite the drilling operation.

An object of this invention is to provide a rotary drill bit which preferably has a convention A.P.I. tapered pin which will readily screw onto a complementary tool joint or rock bit sub of a rotary drill stem in such manner as to lock the blades in secure relation within the bit body.

Another object of the invention is to provide a drill bit which may be easily assembled and disassembled, and which is sturdy in construction.

Still another object of the invention is to provide a drill bit for use with rotary drilling rigs, which bit is so constructed as to drill or cut the earth formation expeditiously.

Still another object of the invention is to provide a rotary drill bit with removable blades, whereby the blades are locked securely in place by a double locking arrangement when the drill bit is screwed on to a complementary threaded box of a drill stem or a drill stem sub.

Another object of the invention is to provide a drill bit which is so constructed as to give the removable bit blades a supporting shoulder to permit cutting of earth formation, for which unitary bits were heretofore required.

FIG. 1 is a side elevational view of the bit in full outline and also shows a complementary tool joint of a rotary drill stem, in dashed outline, thereon;

FIG. 2 is a sectional view taken on line 2—2 of FIG. 1 looking in the direction indicated by the arrows;

FIG. 3 is a sectional view, on a reduced scale, taken on line 3—3 of FIG. 1, looking in the direction indicated by the arrows;

FIG. 4 is a sectional view, on a reduced scale, taken on line 4—4 of FIG. 1, looking in the direction indicated by the arrows;

FIG. 5 is a parti-sectional view, similar to FIG. 2, but on a reduced scale, and showing the manner of insertion of the drill bit blade into the body of the drill bit;

FIG. 6 is an elevational view of a modified form of the bit, which preferably has an A.P.I. tapered tool joint with A.P.I. thread thereon and showing a portion of a drill sub in dashed outline fitted thereon;

FIG. 7 is a sectional view taken on line 7—7 of FIG. 6 looking in the direction indicated by the arrows;

FIG. 8 is a sectional view taken on line 8—8 of FIG. 6 looking in the direction indicated by the arrows and showing a portion thereof in exploded relation;

FIG. 9 is a sectional view taken on line 8—8 of FIG. 6 looking in the direction indicated by the arrows; and FIG. 10 is a fragmentary, elevation view with portions thereof shown in section and showing a bit blade in exploded relation with respect thereto.

With more detailed reference to the drawings with particular reference to the drawings as shown in sections 1 through 5, the numeral 1 designates generally a bit body which has a tapered screwthreaded pin 2 on the upper end thereof, an axial opening 4 extends downward through the pin 2 and through the body 1 to the lower end thereof for the passage of drilling fluid therethrough. The body 1 has longitudinal grooves 6 formed at spaced intervals around the circumference thereof, as by milling or the like, to complementally receive elongated bit blades 8 which are adapted to fit in the bit body 1, as will best be seen in FIGS. 2, 3, and 4. The upper end of each groove 6 has a transverse groove 10 formed therein, which is substantially the same depth as the grooves 6. Each elongated bit blade 8 has a transverse member 12 thereon which loosely interfits within a transverse groove in the bit body 1, which groove is of slightly greater width and length than bit blade 8, as will best be seen in FIGS. 1 and 3. The elongated bit blades 8 each have a tang 14 on the upper end thereof which is of a height to fit within the upper end of groove 6, with the upper face of each tang 14 being below the root diameter of the threads of pin 2, so upon engaging with the box 16 of a sub or a tool joint with the threads of pin 2, the elongated bit blade 8 is held in secure relation on the bit body 1. Each blade 8 has an outstanding pin 18 thereon intermediate the length thereof, which pin is adapted to move into a recess 24 in the lower end of bit body 1 when the elongated bit blades are moved from the position indicated in FIG. 5 to that as shown in FIG. 2. With the bit blade 8 in the position as indicated in FIG. 2, the box 16 of the tool joint is screwed into place until the face end thereof is in binding engagement with the upper face 20 of transverse member 12 of the respective blades 8, and since the outer face of each tang 14 is even with the root diameter of threads of pin 2, the upper end of each bit blade 8 will be held, in secure relation. Each elongated bit blade 8 has an outstanding pin 18 intermediate the length thereof. Each outstanding pin 18 is adapted to slide downward along an angular face 22 on bit body 1 and into one of the recesses 24 near the lower end of bit body 1. An upturned portion 26 of the bit body adjacent to each recess 24 prevents lateral movement of the elongated bit blades 8 and the respective bit blades 8 are held in secure relation for rotary drilling operations.

The lower ends 28 of the respective bit blades 8 are sharpened so as to cut through the earth formation when rotated and pressure is applied thereto, and a drilling fluid directed through the axial opening 4 in the bit body 1. The bit body 1 has a back-up lip portion 30 adjacent to and in contact relation with the rear face of each of the bit blades 8, so as to transfer the presure of the rotating bit blades to the bit body 1. The back-up lip portion 30 has a downwardly extending lug 32 thereon which extends below the discharge opening of the bit body 1, so as to support the rear portions of the elongated bit blade 8 at a point which is in close proximity to the cutting edges of the respective blades.

It is preferable to tip the lower ends 28 and the side 34 of each bit blade 8 with hard surfacing material, such as tungsten carbide, or with other hard metal surfacing products, such as Stellite, Stoodite, Haskelloy, or the like, which are well known in the drilling art.

*Modified form of invention*

A modified form of the invention is shown in FIGS. 6 through 10, which shows a bit body 41, which bit body has a tapered, screwthreaded, A.P.I. type pin 42 on the upper end thereof. An axial opening 44 extends axially through the pin 42 and the body 41 for passage of drilling fluid therethrough. The body 41 has longitudinal seats 46 formed thereon at circumferentially spaced intervals, which seats may be formed by milling, to complementally receive elongated bit blades 48, which blades are adapted to complementally fit within the respective seats on the body 41. The upper portion of the body 41 has an annular groove 50 therearound, immediately below the base of screwthreaded, tapered pin 42. The annular groove 50 is adapted to receive an arcuate member 52 therein in complementary relation, as will best be seen in FIGS. 6 and 8. Each arcuate member 52 on each elongated bit blade 48 has an upper flat face 59 formed thereon to complementally receive the lower end of a box 56 of the sub of a tool joint or the like, which is screwthreaded to receive the threads of pin 42, so as to hold the elongated bit blades 48 in secure relation within annular seats 46 on the bit body 41.

Each bit blade 48 has an outstanding abtutment 58 thereon, intermediate the length thereof. Each abutment 58 is adapted to slide along an angular face 62 on bit body 41 and into one of the recesses 64 near the lower end of bit body 41. An upturned portion 66 of the bit body 41, adjacent each recess 64, prevents lateral movement of the elongated bit blades 48, and the respective blades 48 are held in secure relation by the box 56 of the tool joint, to enable rotary drilling operations to be performed by the bit. The lower ends 68 of the respective bit blades 48 are so sharpened as to cut through the earth formation when rotated by a rotary drilling rig, with pressure being applied thereto and drilling fluid being directed through the axial opening 44 in the bit body 41. The bit body 41 has a back-up lip portion 70, which lip portion has a downwrdly extending lug 72 thereon, which lug extends below the discharge opening of the bit body 41 to support the rear portion of the elongated bit blades 48 at a point in close proximity to the cutting edge of the respective bit blades.

*Assembly*

To assemble the bit blades 48 onto the bit body 41, the blade is moved into the position as shown in FIG. 10, and each bit blade 48 is moved radially inward until the inner faces of the respective abutments 58 engage downwardly sloping face 62 on bit body 41, and the inner face of each arcuate member 52 engages a cylindrical shoulder 53, whereupon, the elongated bit blade 48 is moved downward, parallel with the axis of the bit body 41, with the arcuate members 52 each seating within the respective portions of the annular recess 50, and simultaneously the abutment 58 will be moved downwardly into recess 64 and the abutment will be held against outward movement by the up-turned projections 66 on the bit body 41. Upon screwing the box 56 of the tool joint sub into binding engagement with the respective upper faces 54 of arcuate member 52, the arcuate members 52 are retained against longitudinal or lateral movement with respect to the bit body 1, and the drill bit is ready for rotary drilling operations.

Having thus clearly shown and described the invention, what is claimed as new and desired to be secured by Letters Patent is:

1. A drill bit for use with a rotary well drilling rig, which drill bit comprises;
    (a) a body,
        (1) a screwthreaded pin on the upper end of said body,
        (2) a shoulder formed on said body at the lower end of said screwthreaded pin,
        (3) said bit body having an axial hole formed therethrough,
        (4) said bit body having elongated seats formed thereon at spaced intervals therearound to receive elongated bit blades thereon,
        (5) said body having an arcuate recess formed therein, at least a part of which arcuate recess is near the lower end of said screwthreaded pin and being spaced so as to extend on each side of said respective seats to receive elongated bit blades,
        (6) the lower end of said bit body having a plurality of projections formed thereon at spaced intervals therearound near the lower end thereof,
            (i) a portion of the bit body and each said up-turned projection forming a recess,
    (b) elongated bit blades,
        (1) an abutment formed on each said elongated bit blade intermediate the length thereof,
        (2) an arcuate member formed on the upper end of each said elongated bit blade,
    (c) the screwthreaded box of a tool joint adapted to complementally engage said screwthreaded pin of the bit body and to bindingly engage with the upper face of each said arcuate member on said elongated bit blades to bindingly engage said elongated bit blades against lateral and longitudinal movement with respect thereto, and
        (1) said abutment on each bit blade being adapted to seat within each said recess in said bit body inward from said up-turned projection thereon, so as to retain said elongated bit blade against lateral and longitudinal movement.

2. A drill bit for use with a rotary well drilling rig, which drill bit comprises;
    (a) a body,
        (1) a screwthreaded pin on the upper end of said body,
        (2) a shoulder formed on said body at the lower end of said screwthreaded pin,
        (3) said bit body having an axial hole formed therethrough,
        (4) said bit body having elongated grooves formed therein to form seats thereon at spaced intervals therearound to receive elongated bit blades thereon,
        (5) said bit body having transverse recesses formed therein, at least a part of each recess being near the lower end of said screwthreaded pin and being above and adjacent said shoulder and being spaced so as to extend on each side of the respective seats to receive elongated bit blades,
        (6) the lower end of said bit body having a plurality of projections formed thereon at spaced intervals therearound near the lower end thereof
            (i) a portion of the bit body and each said up-turned projection forming a recess,
    (b) elongated bit blades,
        (1) an abutment formed on each said elongated bit blade intermediate the length thereof,
        (2) each said elongated bit blade having a transverse portion formed thereon to complementally seat in the respective elongated grooves and transverse recesses in the bit body,
    (c) the screwthreaded box of a tool joint adapted to complementally engage the screwthreaded pin of the drill bit to bindingly engage the upper face of each transverse portion on said elongated bit blades with the shoulder of said body to bindingly engage said elongated drill bit blades against lateral and longitudinal movement,
        (1) said abutment on each said bit blade being adapted to seat within one of said recesses in said bit body inward from said up-turned projections thereon, so as to retain said elongated bit blade against lateral and longitudinal movement.

3. A drill bit for use with rotary drill stems, as defined in claim 2; wherein
   (a) a plurality of outwardly extending lips are formed on said bit body in circumferentially spaced relation,
   (b) said outwardly extending lips each being adjacent to one of said grooves, and having a side thereof complementary to the rear face of the respective blades, so as to be in supporting relation with the rear face of the blades throughout the major portion of the length thereof.

4. A drill bit for use with a rotary well drilling rig, which drill bit comprises; the structure as defined in claim 2; wherein
   (a) the screwthreaded pin of said bit body is tapered, and
   (b) wherein the upper end of the bit blade, which is fitted within the groove below the root diameter of the threads of said screwthreaded pin, is tapered and adapted to be held tightly in place upon engagement of the screwthreaded tool joint in binding relation with said elongated bit blades.

5. A drill bit for use with a rotary drilling rig, as defined in claim 2; wherein
   (a) said lip on said bit body extends to a point below the axial hole in said bit body.

6. A drill bit for use wtih a rotary well drilling rig, as defined in claim 2; wherein
   (a) each said seat on said body is an elongated groove which extends into the threaded portion of said screwthreaded pin,
   (b) a tang is formed on the upper end of each said elongated bit blade, which tangs are adapted to fit loosely in the respective grooves in the threaded portion of said screwthreaded pin,
   (c) the box of the tool joint which threadably engages said screwthreaded pin engages in such manner that the threads of the screwthreaded box will bindingly engage the outer sides of said tangs.

7. A drill bit for use with a rotary drill stem, which drill bit comprises;
   (a) a body,
      (1) a screwthreaded connection on the upper end of said body,
      (2) said body having an axial hole formed therethrough,
      (3) said body having circumferentially spaced, longitudinal seats formed thereon, one of which seats extends to a point adjacent the lower end of said threads of said screwthreaded pin,
      (4) said body having an arcuate recess formed therein, at least part of which arcuate recess is near the lower end of said screwthreaded pin and being spaced so as to extend on each side of the respective seats to receive said elongated bit blades,
      (5) The lower end of said bit body having a plurality of up-turned projections formed thereon at spaced intervals around the lower end thereof,
         (i) a portion of the bit body and each said up-turned projection forming a recess adjacent the respective longitudinal seats formed on said body,
   (b) elongated bit blades, each said blade being adapted to complementally fit on one said longitudinal seat of said bit body,
      (1) an arcuate member mounted on the upper end of each said elongated bit blade,
      (2) an outstanding abutment formed on a side of each elongated bit blade intermediate the ends thereof and adapted to complementally fit on said respective seats, and being retained thereon by said up-turned portions on the lower end of said bit body, and
      (3) said screwthreaded connection, on said bit body, being adapted to complementally receive a screwthreaded member to complementally engage the upper ends of said arcuate members to retain said elongated bit blades on said bit body.

8. A drill bit for use with a rotary drill stem, as defined in claim 7; wherein
   (a) said bit body has an annular groove formed therein around the upper portion thereof, which annular groove is coaxial with the axis of said body,
   (b) said seats being spaced symmetrically around said bit body with the upper portions thereof terminating in said annular groove,
   (c) each said arcuate member on each said elongated bit blade adapted to extend upward above the upper surface of said portion of said bit body in which said annular groove is formed, when said elongated bit blades are fitted in place.

9. A drill bit for use with a rotary drill stem, as defined in claim 8; wherein
   (a) said bit body has three of said blades spaced circumferentially therearound.

References Cited

UNITED STATES PATENTS

| 2,498,251 | 2/1950  | Creel     | 175—412   |
| 2,615,684 | 10/1952 | Hawthorne | 175—412   |
| 2,861,779 | 11/1958 | White     | 175—412   |
| 2,950,903 | 8/1960  | White     | 175—412 X |
| 2,987,049 | 4/1961  | Skidmore  | 175—413 X |
| 3,182,736 | 5/1965  | Pitifer   | 175—413   |

CHARLES E. O'CONNELL, Primary Examiner.

NILE C. BYERS, JR., Examiner.